United States Patent

Burroughs et al.

[11] 4,061,518
[45] Dec. 6, 1977

[54] METHOD FOR MAKING AN ARTICLE HAVING REPLICATED COATING WITH DURABLE DIELECTRIC OVERCOAT

[75] Inventors: Viola F. Burroughs; Hasso G. Vahl, both of Los Angeles; Harro W. D. Wahl, Whittier, all of Calif.

[73] Assignee: Harold C. Hohbach, Atherton, Calif.

[21] Appl. No.: 694,651

[22] Filed: June 10, 1976

Related U.S. Application Data

[63] Continuation of Ser. No. 484,409, July 1, 1974, abandoned.

[51] Int. Cl.² .................. B32B 33/00; B32B 27/38; B32B 31/26
[52] U.S. Cl. ............................... 156/232; 156/239; 156/241; 156/289; 156/330; 264/1; 427/152; 427/163; 427/166; 427/167
[58] Field of Search ............. 156/230, 232, 235, 245, 156/249, 289, 239, 241, 246, 330; 264/1; 427/133, 135, 162–167, 248, 255, 386, 380, 149, 152; 350/320

[56] References Cited

U.S. PATENT DOCUMENTS

| | | | |
|---|---|---|---|
| 2,456,899 | 12/1948 | Strong | 427/167 |
| 2,628,921 | 2/1953 | Weinrich | 427/166 X |
| 2,911,682 | 11/1959 | Ewald | 264/1 |
| 3,080,270 | 3/1963 | Lorenz | 156/239 X |

Primary Examiner—Douglas J. Drummond
Assistant Examiner—Thomas Bokan
Attorney, Agent, or Firm—Flehr, Hohbach, Test, Albritton & Herbert

[57] ABSTRACT

In the method for making an article having a replicated coating with a durable dielectric overcoat. A master is formed having a surface to be replicated formed thereon. A parting compound such as silicon oil is placed on the surface while under a vacuum. An optical coating is formed in reverse order, with the protective coat first and the reflective coat last, on the coated surface while in the vacuum under a low temperature to cause initial curing of the protective coat without reevaporation of the silicon oil. Thereafter, the optical coating on the master is post-cured in air at an elevated temperature to cause final curing and hardening of the protective coat. After the post-curing has been completed, the replicated part, if desired, is transferred to the part to carry the same and is mounted thereon by a sealing plastic.

6 Claims, 1 Drawing Figure

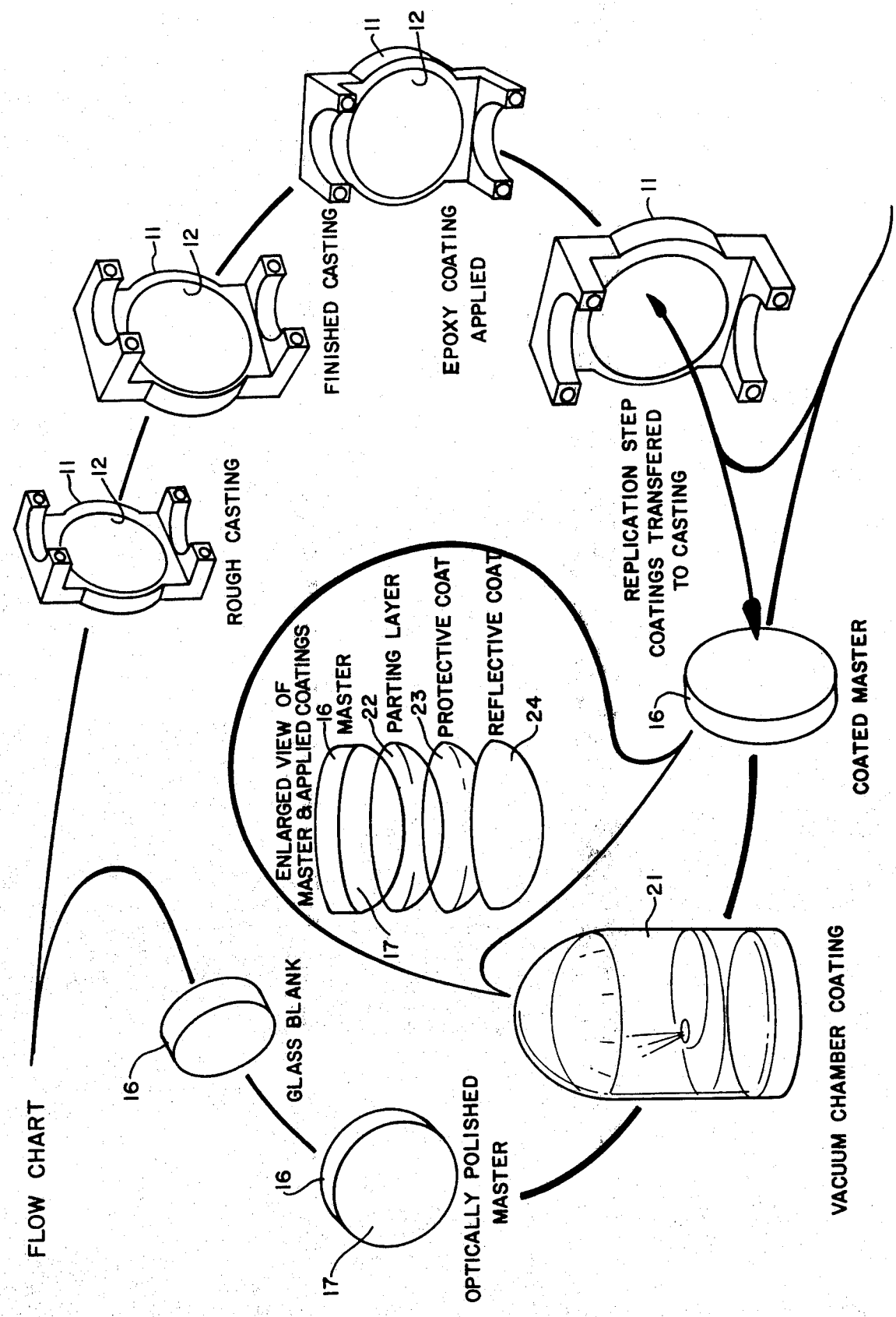

METHOD FOR MAKING AN ARTICLE HAVING REPLICATED COATING WITH DURABLE DIELECTRIC OVERCOAT

This is a continuation, of application Ser. No. 484,409 filed July 1, 1974 now abandoned.

BACKGROUND OF THE INVENTION

Replicated optical parts have heretofore been provided. Much effort has been expended in attempting to improve the coatings utilized in connection with such parts because in general it has been very difficult to provide such coatings with a hard overcoat to make them sufficiently durable for conventional commercial and military uses. There is, therefore, a need for new and improved replicated optical parts having a hard overcoat and a method for making the same.

SUMMARY AND OBJECTS OF THE INVENTION

The method for forming replicated optical parts consists of producing a master having a surface to be replicated formed thereon. A parting compound in the form of silicon oil is placed on the surface while under vacuum. The desired optical coating is then formed in reverse order on the coated surface while in a vacuum. Hard dielectric protective coats are achieved by partial hardening inside the vacuum chamber at a temperature below 100° C to prevent re-evaporation of the silicon oil and then achieving final hardening of the coating by post-curing in air at elevated temperatures between 250° C and 350° C.

In general, it is an object of the present invention to provide a method for making an article having a replicated coating with a durable dielectric overcoat.

Another object of the invention is to provide a method of the above character for making an article of the above character in which the coating has sufficient hardness and resistance to abrasion and moisture resistance to meet the requirements for commercial and military use.

Another object of the invention is to provide a method of the above character for making an article of the above character in which full molecular linking of the materials forming the dielectric coating occurs.

Another object of the invention is to provide a relatively economical method of the above character for making an article of the above character which is relatively economical.

Additional objects and features of the invention will appear from the following description in which the preferred embodiments are set forth in detail in conjunction with the accompanying drawing.

BRIEF DESCRIPTION OF THE DRAWING

The FIGURE of the drawing is a flow diagram showing the method utilized for manufacture of an article having a reflective coating with a durable dielectric overcoat.

DESCRIPTION OF THE PREFERRED EMBODIMENTS

In fabricating an article having a replicated coating with a durable dielectric overcoat thereon utilizing the method of the present invention, a suitable support element or member 11 serving as a backing material is provided. For example, as shown in the drawing, the support element can be in the form of a casting formed of a suitable material such as aluminum. Alternatively, other types of backing material can be utilized such as metals and crystalline materials such as glass, quartz, etc. The element 11 can be either cast or machined into its final dimensions and can be provided with a surface 12 which is to receive the optical coating thereon. As can be seen from the drawing, the surface 12 in the casting 11 is a concave surface forming part of a sphere.

A master 16 is prepared also from a suitable material. The master is preferably formed from a material which is more suitable for use as a master, whereas the support element or member 11 which is utilized for the backing must be selected for its ultimate use. The material for the master should be selected so that a surface can be provided with the desired finish. Thus, for example, the glass blank serving as a master 16 can be provided with an optically polished surface 17 which is the complement of the surface 12. Thus, the surface 17 can be convex and form a portion of a sphere. The finish provided on the surface 17 depends upon the application for which the optical coating is to be utilized. By way of example, the surface 17 can be provided with a 60–40 finish which is a finish well known to those skilled in the art with the first number designating the maximum scratches on the surface and the other number designating the maximum holes in the surface. If desired, finishes as good as 5–10 can be provided.

After the optically polished surface 17 has been provided, the masters are cleaned in a suitable manner such as by ultrasonic cleaning to remove all contaminants from the surface 17. The master is then placed in a suitable vacuum coating apparatus as, for example, the vacuum chamber 21 shown in the drawing. A reverse coating process is then provided for providing a coating on the surface 17 of the master 16 as hereinafter described. The first step in the reverse coating process is to provide a parting or release layer 22 on the surface 17. In order to practice the present invention, it has been found that it is desirable to utilize high vacuum diffusion pump fluids as, for example, Dow Corning 705 silicon oil. Typically, such silicon oils have a vapor pressure of below $10^{-10}$ Torr at ambient temperatures.

When a liquid such as silicon oil is utilized as the parting layer, it is desirable that the liquid have a low vapor pressure and also that it have a molecular structure which does not add to the surface roughness of the master. It also must have characteristics which make it possible to clean off any residue of the parting layer from the finished product. As hereinafter explained, silicon oil is particularly desirable because it is easily evaporated in a vacuum and it has good high temperature characteristics as hereinafter explained.

There are several methods which can be utilized for evaporating the release agent so that it is applied as a thin parting layer 22 to the surface 17 of the master. In each case, heat is utilized in conjunction with a vacuum. By one method, the silicon oil is evaporated by the use of heat and then a microbalance is utilized to determine the physical thickness of the film deposited on the surface 17. This method has a disadvantage in that it is important not to have any unevaporated release agent within the chamber after the desired physical thickness of the parting layer 22 has been attained. It has been found that a more accurate method is to calculate the thickness of the desired parting layer and then to utilize a microhypodermic needle and then depositing a premeasured amount of the silicon oil onto a tungsten heating filament (not shown) within the vacuum chamber.

Current is then supplied to the heat filament to cause the silicon oil deposited thereon to be evaporated under the physical laws of thin film deposition to be deposited upon the surface 17. In making the calculations to determine the amount of silicon oil to be placed on the filament, the area of the sphere is calculated to determine the desired thickness.

Although deposition of the silicon oil will take place at a vacuum as high as $10^{-6}$ Torr, it is important to maintain and reproduce the same conditions which were assumed when making the calculations to determine the amount of silicon oil to be placed in the vacuum chamber. If the vacuum within the vacuum chamber reaches the value of approximately $10^{-8}$ Torr, the parting layer may become too thick which can cause floating of the coating deposited thereon and may subsequently cause it to break up. In general, it is desirable to form the parting layer 22 so that it is essentially a monomolecular layer of silicon oil.

In performing the evaporation, the filament is heated to a relatively low temperature so that it does not even reach a dull red color. For example, a temperature ranging from approximately 100° C to 300° C has been found to be adequate, the principal requirement being that reproducible or repeatable results be attained by providing a parting layer 22 of the proper thickness. With very little trial and error, the exact amount of silicon oil can be verified as well as the temperature and the vacuum required for obtaining the proper thickness of the parting layer.

Although it is not absolutely essential to utilize the silicon oil in conjunction with the present method, it has been found that it is by far the most satisfactory parting layer. Thin layers of metal such as gold and silver have been utilized as a parting layer. However, when utilizing such parting layers, it is necessary that the parting layer be chemically dissolved to separate the replicated coating from the master.

It should be appreciated that the evaporation can be carried out in a conventional manner. For example, the master or masters can be placed on a fixture within the vacuum chamber and the fixture rotated to obtain a more uniform distribution of the parting material on the surface 17.

In carrying out the evaporation of the silicon oil, the filament is heated slowly to prevent sputtering of the material. In order to ensure that all of the silicon oil has been evaporated, the filament may be brought to an elevated temperature exceeding the evaporation temperature. Thus, in a typical evaporation cycle, the vacuum chamber is pumped down after which the silicon oil is evaporated over a suitable period of time as, for example, 5 minutes and thereafter the filament is permitted to cool down for a few minutes and then the tooling carrying the master or masters is quickly removed from the vacuum chamber and transferred to another vacuum chamber to minimize contamination from the air.

It is in this second chamber that the optical coating comprising a protective coat or coating 23 and the reflective or refractive coating 24 is deposited. In either case, the reflective or refractive coating can be a single layer or a multi-layer with the principal difference being that the coatings 23 and 24 are deposited in reverse order in comparison to normal coating techniques.

Thus, for a front surface mirror which normally has a pass band in the visible region, silicon monoxide or magnesium fluoride forms the protective overcoat. In forming a conventional front surface mirror, the reflective material such as aluminum would be deposited first and thereafter the protective overcoat of silicon monoixde or magnesium fluoride. In replication as in the present method, the reverse is true and the protective overcoat is first deposited on the parting layer and thereafter the reflective or refractive coat.

Even though the protective coat 23 may be a relatively soft coat, it is harder than an evaporated metal reflective coat as, for example, one formed of gold or silver or aluminum. In the case of aluminum or silver, the protective overcoat not only provides physical protection against normal handling such as finger prints and scratches but also enhances reflectivity of the aluminum in the ultra-violet by preventing oxidation. In replication, this becomes more significant because the time period between the deposition of the aluminum and the reflective overcoating is greatly reduced. Thus, it is desirable to minimize as much as possible the time between the deposition of the protective coating 23 and the reflective coat 24 to reduce oxidation as much as possible. In replication as hereinafter described, this time can be reduced greatly because the reflective coat can be followed up immediately after the protective overcoat has been deposited.

In order to obtain a hard overcoat, the protective coat 23 is deposited in a particular manner. For this protective hard overcoat, suitable dielectric materials such as silicon monoxide or magnesium fluoride can be utilized. The parameters for depositing such coatings are well known to those skilled in the art of depositing coatings. In general, they are deposited in a vacuum ranging from $10^{-5}$ to $10^{-6}$ Torr.

In accordance with the present invention, the hard protective coat 23 is deposited after the master 16 has been brought up to a temperature not exceeding approximately 100° C. It has been found to accomplish the objectives of the present invention to achieve a partial curing of the hard overcoat that the hard overcoat be deposited on the master when it is at a temperature ranging from approximately 40° C to 100° C. It has been found that when material is deposited on the master at a temperature below 40° C, it is difficult to achieve full post-curing of the type hereinafter described. When the master is above 100° C, it is found that there is some hardening of the protective overcoat which lends itself to the post-curing operation hereinafter described. When the temperature of the master exceeds 100° C, it has been found that the parting layer which is formed of silicon oil begins to re-evaporate which destroys the parting layer. After the protective coat has been formed, the reflective or refractive coat 24 is also formed on the master in the same low temperature range specified above. In this way, the protective and the reflective or refractive coats which are utilized in conventional coatings can be formed on the master 16, the only difference being that they are deposited in the reverse order than in the conventional case.

After the coating operation has been completed in the vacuum chamber by forming both the protective hard overcoat 23 and the reflective coating 24, the master is removed from the coating chamber and placed in an oven in air to initiate the curing sequence. The oven is either maintained at a suitable temperature or is brought up to a suitable temperature with a minimum temperature ranging from 200° C to 300° C to initiate the post-curing operation. The post-curing operation should be carried out for a suitable period of time for a minimum period of approximately 4 hours. The maximum temperature utilized will vary with the materials forming the coating and particularly the protective hard overcoat. If for example, magnesium fluoride is used, a temperature as high as 360° C is desirable.

It has been found that in this post-curing operation, the protective hard overcoat becomes fully hardened and forms a hard layer. It has been found that in the post-curing cycle different steps may be required for the various materials which are utilized in the coatings. However, in general, as pointed out above, the post-curing operation must be carried out at a temperature above approximately 200° C for a period of approximately 4 hours. In certain materials as, for example, magnesium fluoride, it is desirable to post-cure the magnesium fluoride in two separate cycles. One is to achieve slow and partial hardening at a lower temperature as, for example, by bringing the master with the coating thereon slowly up to 200° C to prevent decomposition of the silicon oil before the dielectric coatings have had an opportunity to sufficiently harden. The master or part is held at this temperature for approximately 2 hours and thereafter the temperature is increased to above 300° C to produce the final hardening of the dielectric layers. By using this procedure, it has been found that the partial hardening of the magnesium fluoride is attained to provide a cohesive hard layer without substantial decomposition of the parting layer formed of the silicon oil. At the time the elevated temperatures are reached, the protective coat or layer is sufficiently hard so that it remains intact even though there is the re-evaporation of silicon oil from the parting layer which may be forced through pinholes and voids of the dielectric protective overcoat and the refractive or reflective coat.

After the post-curing operation has been completed, the master or masters are removed from the oven and are permitted to cool to room temperature. The outer surface of the reflective or refractive coat is then cleaned to facilitate adherence of the epoxy which is utilized to bond the optical coating to the support element.

The support member or casting 11 is then taken and provided with a finished surface 12. As pointed out previously, it has been found that it is desirable to utilize aluminum castings for this purpose because they can be fully stress relieved and cold stabilized to prevent localized distortions during the curing cycle of the epoxy resin which is utilized as hereinafter described.

After the master 16 has been coated as hereinbefore described, a premeasured amount of an epoxy resin is placed on the surface 12 as shown in the drawing, and thereafter the coated master 16 is transferred to the casting with the coating facing the surface 12. As hereinbefore explained, since the surface 12 has been formed to mate with the surface of the master, there is a substantially perfect fit between the coating and the surface 12.

The epoxy resin has a two-fold function. First, it fills any surface roughness in the surface 12 of the backing or support element 11 and secondly it serves to bond the optical coating carried by the master to the surface 12. Commercially available epoxies can be utilized. For example, typical epoxies are Shell Resin 815, 828 or 820 and suitable curing agents. The curing agents are selected for their final use or final quality of the coating which is to be applied to the support member or casting 11.

The epoxy is cured at a suitable range of temperature as, for example, 50° to 65° C for a suitable period of time as, for example, ranging from 4 hours to 48 hours. Where the coating is to be utilized at high temperature applications, curing can be carried out at temperatures in excess of 100° C and higher. When such high temperature requirements must be met, different curing agents and epoxy resins are utilized. In general, it can be stated that the slower the curing operation, the more precision will be the finished product. The curing operation causes a full cross linking of the catalyst and the resin.

During the curing operation of the epoxy, there may be considerable differential of expansion between the glass master and the support element 11. For example, where the support element 11 is formed of aluminum, the aluminum can expand by a factor of 80 or more than that of glass. However, it has been found that if the aluminum is fully annealed, it will expand uniformly.

After the curing operation for the epoxy has been completed, the master is separated from the coating. This can be accomplished in a number of ways. However, it has been found that when the aluminum is utilized as the support element, parting can be accomplished by thermal shock. This is accomplished by rapid cooling and heating where the metal is caused to expand and contract more rapidly than that of glass and thereby cause a break or separation at the parting layer.

In situations where thermal shock is not appropriate as, for example, where the master and the support member are formed of the same materials as, for example, glass, other parting methods must be utilized. In such cases, bevels may be provided on each of the parts and then tooling can be utilized for applying a parting pressure by the use of a wedge effect to separate the master from the optical coating.

After the master has been removed, the support element is provided with the replicated coating which has excellent characteristics. It has a hard protective overcoat which can meet all commercial and military requirements met by non-replicated parts as to hardness.

By the present invention there has been provided a method which makes it possible to achieve some hardening of the protective overcoat at slightly elevated temperature inside the vacuum system but which is not high enough to re-evaporate the parting layer. Thereafter, after the initial curing or hardening of the overcoat, the part is raised to an elevated temperature in an oven to fully cure the protective overcoat.

In conventional front surface mirrors, the aluminum is deposited very rapidly. However, before a protective overcoat can be provided on the same, there is some oxidation of the aluminum which results in a fall-off in reflectivity. In replication by the present method where the protective overcoat is deposited first and thereafter the aluminum, it is possible to first form the protective overcoat and then immediately thereafter to evaporate on the aluminum layer so there is no opportunity of oxidation of the aluminum to take place which could reduce the reflectivity. The protective hard overcoat can be made hard by the post-curing operation hereinbefore described.

By way of example, it has been found that with replicated coatings made in accordance with the present invention, it is possible to achieve 93% reflectivity at 2000 Angstroms. The protective overcoat can be as thin as 250 Angstroms.

We claim:

1. In a method for forming replicated optical parts, producing a master having a surface to be replicated formed thereon, depositing in a vacuum a parting agent in the form of a silicon oil on to the surface to form a thin parting layer of the silicon oil, forming a protective coating on the parting layer in a vacuum at a relatively low temperature ranging from approximately 40° to 100° C but at a sufficiently high temperature to cause an initial partial curing of the protective coat, forming an optical coating on the protective coat at a relatively low temperature ranging from approximately 40° to 100° C, and post-curing the part with the coats thereon in air at an elevated temperature in excess of approximately 200° C for a minimum period of time in excess of approximately 4 hours to cause final curing and hardening of the protective coat.

2. A method as in claim 1 wherein said post-curing is carried out by first curing at a temperature of approximately 200° C for a period of approximately 2 hours and thereafter carrying out post-curing at an elevated temperature above 300° C.

3. A method as in claim 1 together with the step of providing a support element having a surface for carrying a replicated optical coating and protective coat formed on the master, bonding the optical coating on the master to said surface of said supporting element and separating the master from the protective coat so that the supporting element is provided with the optical coating and protective coat carried by the master.

4. A method as in claim 7 wherein the step of bonding the master to the supporting element is carried out by the use of an epoxy and curing the epoxy to form the bond.

5. In a method for forming replicated optical parts, producing a master having a surface to be replicated formed thereon, depositing by evaporation in a first vacuum chamber on said surface a thin layer of silicon oil to serve as a parting layer, removing the master from the first vacuum chamber and transferring the same to a second vacuum chamber and minimizing the contamination from air during the transfer, forming a protective coat on the surface of the master in the second vacuum chamber at a temperature ranging from approximately 40° C to 100° C to cause an initial partial curing of the protective coat while retaining the silicon oil parting layer intact, forming an optical coating on the protective coat in the second vacuum chamber at a relatively low temperature from approximately 40° C. to 100° C, and post-curing the part with the coats thereon in air at an elevated temperature in excess of approximately 200° C for a minimum period of time in excess of approximately 4 hours to cause final curing and hardening of the protective coat.

6. A method as in claim 5 wherein the silicon oil is evaporated in the first vacuum chamber by placing it on a filament and then heating the filament to a temperature ranging from approximately 100° C to 300° C.

* * * * *